US012620025B2

(12) United States Patent
Agrawal et al.

(10) Patent No.: US 12,620,025 B2
(45) Date of Patent: May 5, 2026

(54) MACHINE LEARNING MODEL SELECTION FOR ACCOUNTS RECEIVABLE PREDICTIONS

(71) Applicant: Oracle International Corporation, Redwood Shores, CA (US)

(72) Inventors: Vikas Agrawal, Hyderabad (IN); Krishnan Ramanathan, Kadubeesanahalli (IN); Praneeth Medhatithi Shishtla, Telangana (IN); Jagdish Chand, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 191 days.

(21) Appl. No.: 18/461,713

(22) Filed: Sep. 6, 2023

(65) Prior Publication Data

US 2025/0014118 A1 Jan. 9, 2025

Related U.S. Application Data

(60) Provisional application No. 63/525,191, filed on Jul. 6, 2023.

(51) Int. Cl.
*G06Q 40/00* (2023.01)
*G06N 20/00* (2019.01)
(Continued)

(52) U.S. Cl.
CPC ............. *G06Q 40/03* (2023.01); *G06N 20/00* (2019.01); *G06Q 20/085* (2013.01); *G06Q 30/0204* (2013.01); *G06Q 40/12* (2013.12)

(58) Field of Classification Search
None
See application file for complete search history.

(56) References Cited

U.S. PATENT DOCUMENTS 10,817,805 B2 * 10/2020 Vasudevan ............. G06N 3/084
12,002,087 B1 6/2024 Mccormick et al.
(Continued)

FOREIGN PATENT DOCUMENTS

WO 2010006187 A2 1/2010
WO 2013147932 A1 10/2013
WO 2020039198 A1 2/2020

OTHER PUBLICATIONS

Chicco et al., "The Matthews correlation coefficient (MCC) is more reliable than balanced accuracy, bookmaker informedness, and markedness in two-class confusion matrix evaluation",BioData Mining, 2021, 22 pages.
(Continued)

*Primary Examiner* — Olabode Akintola
(74) *Attorney, Agent, or Firm* — Potomac Law Group, PLLC

(57) ABSTRACT

Embodiments predict a target variable for accounts receivable using a machine learning model. For a first customer, embodiments receive a plurality of trained ML models corresponding to the target variable, the plurality of trained ML models trained using the historical data and comprising a first trained model having no grace period for the target variable and two or more grace period trained models, each grace period trained model having different grace periods for the target variable. Embodiments determine a Matthews' Correlation Coefficient ("MCC") for the first trained model. When the MCC for the first trained model is low, embodiments determine the MCC for each of the grace period trained models, and when one or more MCCs for each of the grace period trained models is higher than the MCC for the first trained model, embodiments select the corresponding grace period trained model having a highest MCC.

20 Claims, 11 Drawing Sheets

(51) Int. Cl.

| | |
|---|---|
| *G06Q 20/08* | (2012.01) |
| *G06Q 30/0204* | (2023.01) |
| *G06Q 40/03* | (2023.01) |
| *G06Q 40/12* | (2023.01) |

(56) References Cited

U.S. PATENT DOCUMENTS

| | | |
|---|---|---|
| 2014/0379310 A1 | 12/2014 | Ramachandran et al. |
| 2016/0078032 A1 | 3/2016 | Wang |
| 2019/0102718 A1 | 4/2019 | Agrawal et al. |
| 2019/0287182 A1 | 9/2019 | Chetal et al. |
| 2019/0311301 A1 | 10/2019 | Pyati |
| 2021/0117842 A1 | 4/2021 | Smith et al. |
| 2022/0237103 A1 | 7/2022 | Agrawal et al. |
| 2022/0301031 A1 | 9/2022 | Iyer |
| 2023/0236892 A1 | 7/2023 | Weinstein |
| 2023/0237787 A1 | 7/2023 | Olaleye et al. |
| 2023/0298244 A1 | 9/2023 | Chan et al. |
| 2023/0342738 A1 | 10/2023 | Kunwar et al. |

OTHER PUBLICATIONS

Powers, "Evaluation: From Precision, Recall and F-Measure to ROC, Informedness, Markedness & Correlation", AILab, School of Computer Science, Engineering and Mathematics, Flinders University, South Australia, Australia, 27 pages May 2013.

Paul et al, "Impact of late payment on Firms' profitability: Empirical evidence from Malaysia;" 18 pages, 2012.

Unknown, "Z Table, Negative Z Scoree Table" Zabel.net 10 pages, 2018.

Hafeez, et al., "Measuring Bank Risk: Forward-Looking Z-Score", School of Economics and Finance, Massey University, Palmerston North, NZ, 14 pgs, 2022.

Karras, "Statistical Methodology: II. Reliability and Validity Assessment in Study Design", Part A, Academic Emergency Medicine, vol. 4, No. 1, 8 pgs, Jan. 1997.

Li et al., "Measuring Bank Risk: An Exploration of Z-Score", Massey University, Palmerston North, NZ, 38 pgs, Jan. 2017.

* cited by examiner

300

MACHINE LEARNING MODEL SELECTION FOR ACCOUNTS RECEIVABLE PREDICTIONS

CROSS REFERENCE TO RELATED APPLICATIONS

This application claims priority to U.S. Provisional Patent Application Ser. No. 63/525,191 filed on Jul. 6, 2023, the disclosure of which is hereby incorporated by reference.

FIELD

One embodiment is directed generally to a machine learning model, and in particular to the generation and selection of machine learning models.

BACKGROUND INFORMATION

The process of generating or building a machine learning ("ML") model includes multiple steps. The steps include gathering a suitable dataset for training the model and preprocessing the data by performing tasks such as cleaning, normalizing, and transforming it to a suitable format for training. Then the dataset is divided or split into two or three parts: the training set, validation set, and the test set. The training set is used to train the model, the validation set helps in tuning hyperparameters and assessing model performance, and the test set is used for final evaluation.

A ML model architecture/algorithm is then chosen that is adapted for the problem being solved with machine learning. The problem can be classification, regression, clustering, or any other type of problem. The chosen model can be a decision tree, random forest, support vector machine, neural network, or any other model depending on the nature of the data and problem.

The training set is then used to train the chosen model and the validation set is used to evaluate the model's performance. Once the model's performance is satisfactory, the model is evaluated using the test set. This provides an unbiased estimate of the model's performance and its ability to generalize to new data. Finally, the model can be deployed, and its performance can be monitored over time and adjustments or re-training made as needed. Machine learning metrics can quantify the performance of a machine learning model once it is already trained and can be used to select one or more potential trained models to use. The choice of metrics depends on the type of problem that is being solved (classification, regression, etc.) and include Accuracy, Precision, Recall, F1 Score, Area Under the ROC Curve ("AUC-ROC"), etc.

SUMMARY

Embodiments predict a target variable for accounts receivable using a machine learning model. Embodiments receive historical data corresponding to a plurality of transactions corresponding to a plurality of customers, the historical data comprising, for each of the transactions, the target variable. For a first customer, embodiments receive a plurality of trained ML models corresponding to the target variable, the plurality of trained ML models trained using the historical data and comprising a first trained model having no grace period for the target variable and two or more grace period trained models, each grace period trained model having different grace periods for the target variable. Embodiments determine a Matthews' Correlation Coefficient ("MCC") for the first trained model. When the MCC for the first trained model is low, embodiments determine the MCC for each of the grace period trained models, and when one or more MCCs for each of the grace period trained models is higher than the MCC for the first trained model, embodiments select the corresponding grace period trained model having a highest MCC. When the first trained model or the selected grace period trained model has a high MCC, embodiments deploy the first trained model or the selected grace period trained model to predict the target variable.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Embodiments automatically generate a machine learning ("ML") model for a company/organization that predicts a delay in paying an accounts receivable ("AR") invoice for each specific customer of multiple customers of the company. Embodiments use a deviation-from-median based coefficient of variation to segment the customers by variability distribution of delays and, based on the segmentation, create one or more models for each customer. Embodiments further select among the multiple models for each customer by incorporating a grace period into historical AR delays. Embodiments further determine a customer reliability score for each customer.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
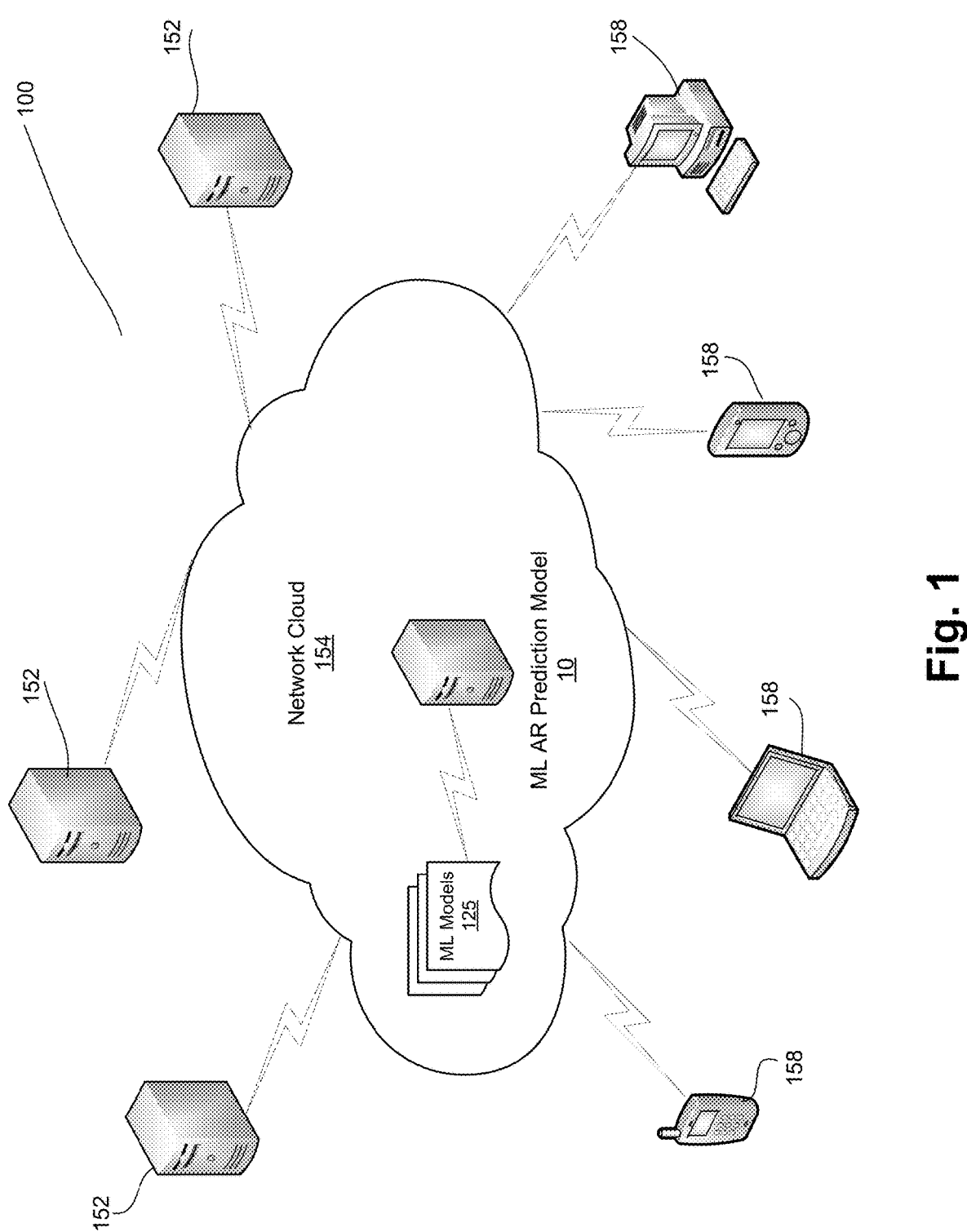
FIG. 1 illustrates an example of a system that includes a machine learning ("ML") accounts receivable ("AR") prediction model system in accordance to embodiments.

FIG. 1 illustrates an example of a system 100 that includes an ML AR prediction model system 10 in accordance to embodiments. ML AR prediction model system 10 may be implemented within a computing environment that includes a communication network/cloud 154. Network 154 may be a private network that can communicate with a public network (e.g., the Internet) to access additional services 152 provided by a cloud services provider. Examples of communication networks include a mobile network, a wireless network, a cellular network, a local area network ("LAN"), a wide area network ("WAN"), other wireless communication networks, or combinations of these and other networks. ML AR prediction model system 10 may be administered by a service provider, such as via the Oracle Cloud Infrastructure ("OCI") from Oracle Corp.

Tenants of the cloud services provider can be companies or any type of organization or groups whose members include users of services offered by the service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 158, which can be any type of device that can access network 154 and can obtain the benefits of the functionality of ML AR prediction model system 10 of generating and selecting ML models for AR delay predictions. As disclosed herein, a "client" (also disclosed as a "client system" or a "client device") may be a device or an application executing on a device. System 100 includes a number of different types of client devices 158 that each is able to communicate with network 154.

Executing on cloud 154 are one or more ML models 125, each of which is generated and/or selected by ML AR prediction model system 10. Each ML model 125 can be executed by a company that is a customer of cloud 154, and that has corresponding customers that purchase goods and services that are expected to pay invoices generated for them by the selling company. In embodiments, an ML model 125 can be accessible to a client 158 via a representational state transfer application programming interface ("REST API") and function as an endpoint to the API. ML models 125 can by any type of machine learning model that, in general, is trained on some training data and test/validation data and then can process additional incoming "live" data to make predictions. Examples of ML models 125 include, but are not limited to, artificial neural networks ("ANN"), decision trees (including but not limited to ensembles such as random forest and gradient boosted trees), support-vector machines ("SVM"), Bayesian networks, etc. Training data can be any set of data capable of training ML model 125 (e.g., a set of features with corresponding labels, such as labeled data for supervised learning). In embodiments, training data can be used to train an ML model 125 to generate a trained ML model 125. In embodiments, each tenant or client has exclusive access to their corresponding ML models 125, and the models 125 are trained using only data provided by the corresponding client (i.e., other clients' data is not used to train a client's model).

Figure 2:
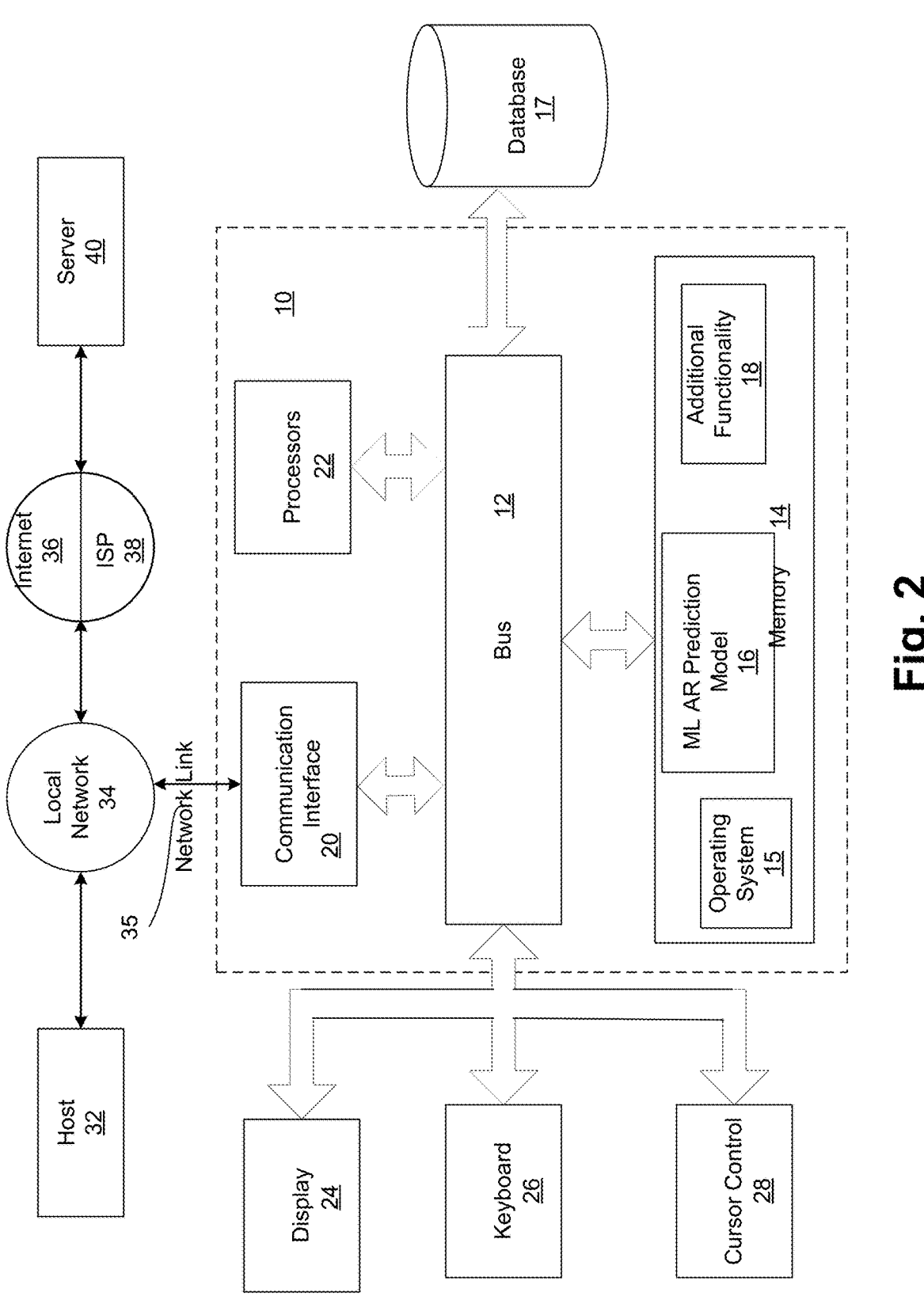
FIG. 2 is a block diagram of the ML AR prediction model system of FIG. 1 in the form of a computer server/system in accordance to an embodiment of the present invention.

FIG. 2 is a block diagram of ML AR prediction model system 10 of FIG. 1 in the form of a computer server/system

10 in accordance to an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. One or more components of FIG. 2 can also be used to implement any of the elements of FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication interface 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an ML AR prediction model module 16 that generates and/or selects one or more ML models for predictions of AR delays, and all other functionality disclosed herein. System 10 can be part of a larger system. Therefore, system 10 can include one or more additional functional modules 18, such as the generated ML models, or a business intelligence or data warehouse application (e.g., "Fusion Analytics Warehouse" from Oracle Corp.) that utilizes the generated ML models. A file storage device or database 17 is coupled to bus 12 to provide centralized storage for modules 16 and 18, including training data used to generate the ML models. In one embodiment, database 17 is a relational database management system ("RDBMS") that can use Structured Query Language ("SQL") to manage the stored data.

In embodiments, communication interface 20 provides a two-way data communication coupling to a network link 35 that is connected to a local network 34. For example, communication interface 20 may be an integrated services digital network ("ISDN") card, cable modem, satellite modem, or a modem to provide a data communication connection to a corresponding type of telephone line or Ethernet. As another example, communication interface 20 may be a local area network ("LAN") card to provide a data communication connection to a compatible LAN. Wireless links may also be implemented. In any such implementation, communication interface 20 sends and receives electrical, electromagnetic or optical signals that carry digital data streams representing various types of information.

Network link 35 typically provides data communication through one or more networks to other data devices. For example, network link 35 may provide a connection through local network 34 to a host computer 32 or to data equipment operated by an Internet Service Provider ("ISP") 38. ISP 38 in turn provides data communication services through the Internet 36. Local network 34 and Internet 36 both use electrical, electromagnetic or optical signals that carry digital data streams. The signals through the various networks and the signals on network link 35 and through communication interface 20, which carry the digital data to and from computer system 10, are example forms of transmission media.

System 10 can send messages and receive data, including program code, through the network(s), network link 35 and communication interface 20. In the Internet example, a server 40 might transmit a requested code for an application program through Internet 36, ISP 38, local network 34 and communication interface 20. The received code may be executed by processor 22 as it is received, and/or stored in database 17, or other non-volatile storage for later execution.

In one embodiment, system 10 is a computing/data processing system including an application or collection of distributed applications for enterprise organizations, and may also implement logistics, manufacturing, and inventory management functionality. The applications and computing system 10 may be configured to operate locally or be implemented as a cloud-based networking system, for example in an infrastructure-as-a-service ("IAAS"), platform-as-a-service ("PAAS"), software-as-a-service ("SAAS") architecture, or other type of computing solution.

Figure 3:
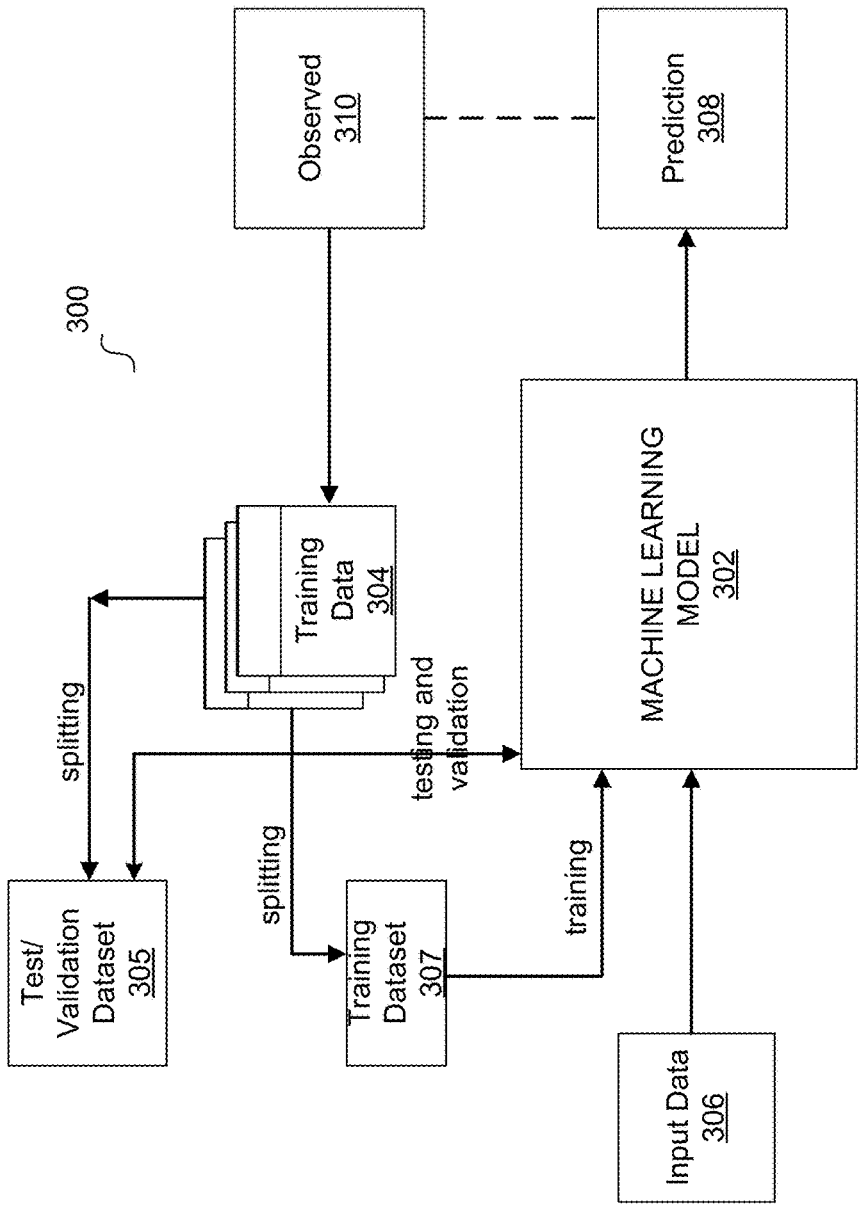
FIG. 3 is a block diagram of a prediction system according to one embodiment.

FIG. 3 is a block diagram of a prediction system according to one embodiment. System 300 includes machine learning model 302, training data 304, input data 306, prediction 308, and observed data 310. In some embodiments, machine learning model 302 can be a designed model that includes one or more machine learning elements (e.g., a neural network, support vector machine, Bayesian network, random forest classifier, gradient boosting classifier, etc.), or a single ML model. Training data 304 can be any set of data capable of training machine learning component 302 (e.g., a set of features with corresponding labels, such as labeled data for supervised learning). In embodiments, training data 304 is time dependent data. Training data 304 is split into a test/validation dataset 305 and a training dataset 307. Training dataset 307 is used to train machine learning model 302 and test/validation dataset 305 is used to test and/or validate the trained ML model 302, and adjust or retrain if necessary.

In some embodiments, the predictions 308 are observed 310, resulting in updating training data 304. The updated training data 304 can then be used to re-train ML model 302.

In some embodiments, the design of machine learning model 302 can be tuned during training, retraining, and/or updated training. For example, tuning can include adjusting the number of hidden layers in a neural network, adjusting a kernel calculation used to implement a support vector machine, etc. This tuning can also include adjusting/selecting features used by the machine learning model. Embodiments include implementing various tuning configurations (e.g., different versions of the machine learning model and features) while training in order to arrive at a configuration for machine learning model 302 that, when trained, achieves desired performance (e.g., performs predictions at a desired level of accuracy, run according to desired resource utilization/time metrics, etc.).

In some embodiments, retraining and updating the training of machine learning model 302 can include training the model with updated training data. For example, the training data can be updated to incorporate observed data, or data that has otherwise been labeled (e.g., for use with supervised learning). In some embodiments, machine learning model 302 can include an unsupervised learning component. For example, one or more clustering algorithms, such as hierarchical clustering, k-means clustering, and the like, or unsupervised neural networks, such as an unsupervised autoencoder, can be implemented.

In embodiments, training data 304 is composed of multiple data points and is time dependent data. For example, in one embodiment, system 300 is adapted to predict whether a customer will pay accounts receivable invoices on time or on a delayed basis in response to one or more past purchase orders or transactions for that customer. In this embodiment, training data 304, which is historical data from past purchases/transactions, includes time dependent data of those transactions which have multiple dates associated with each of them, such as purchase order approval date, transaction date, shipment date, promised receipt date, shipment receipt date, invoice payment date, etc. Some of these dates are fixed dates (e.g., purchase order approval date) and some are variable dates (e.g., shipment date).

One embodiment of the invention generates and selects ML models specifically to predict an occurrence of a delay in payment in response to an AR invoice for a specific customer of multiple customers of the company. In general, generating/training one or more ML models for this type of prediction is difficult due to wide variations among customers. For example, some customers may have a very large percentage (e.g., >70%) of payment of invoices delayed and others have a very small percentage of invoices (e.g., <10%) delayed. The models should account for class imbalance in each customer's data and account for disparate variability in payment delays across customers, such as a customer that may pay relatively small invoices promptly while taking much longer to pay large invoices. The models should produce predictions which tell a company using network cloud 154 for generating ML models 125 by using ML AR prediction model system 10, which of their corresponding customers are likely to default on their payments and/or delay payments.

Figure 4:
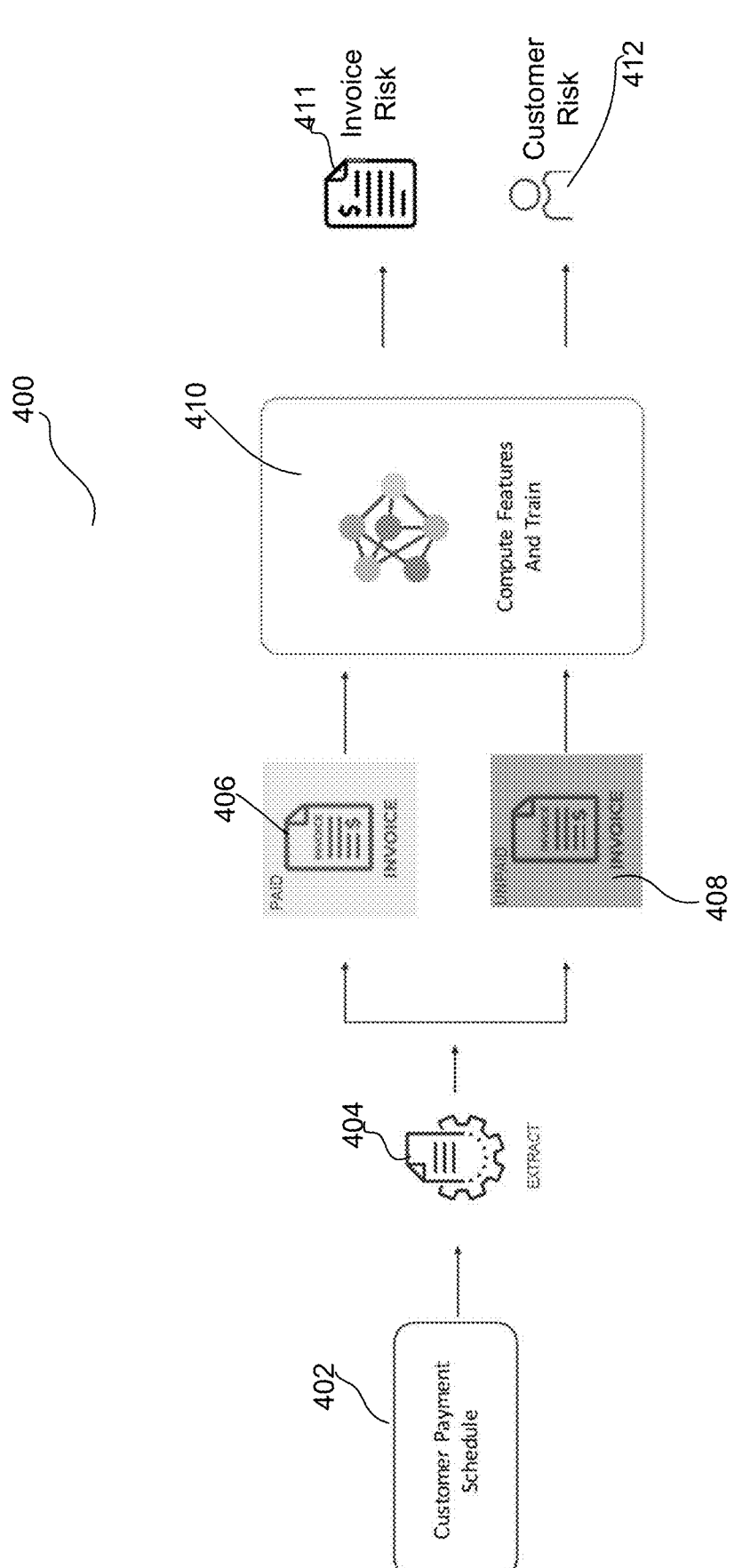
FIG. 4 is a block/flow diagram of a prediction system according to one embodiment for predicting AR related delays and highlighting the riskiest invoices and customers.

FIG. 4 is a block/flow diagram of a prediction system 400 according to one embodiment for predicting AR related delays and highlighting the riskiest invoices and customers. System 400 receives a customer payment schedule 402 which is historical data related to payments for a customer, such as the timeliness of payments in corresponding to many (e.g., thousands) historical purchase order transactions. At 404, features are extracted from the historical data 402. Feature extraction can include separating the transactions into transactions where the invoice was paid at 406, and where the invoice was not paid at 408, and specifying time dependent potential drivers of those classes. At 410, the ML models are trained and selected among multiple models using the features. The resulting trained ML model predicts a risk of future payment risk for a specific invoice for a specific customer for each invoice for each customer at 411, as well as an aggregate risk for every one of the specific customers at 412.

Embodiments solve multiple problems of known solutions of training/selecting ML models to predict AR invoice payments. Problems include situations where the model algorithms determine that the data columns or input variables chosen do not have the distinguishing information to differentiate between the cases which are to-be-defaulted (delayed in payment) and not-to-be-defaulted (not delayed in payment) cases (or any classification problem). In these situations, the model (or related logic) should inform the model "owner" (e.g., company) of the inability to distinguish, and/or retrain other models, and/or segment customers or invoices in such a way as to be able to distinguish the defaulters from non-defaulters.

Further, if the model algorithms are run by including a grace period, such as median of delays in all invoices (or other percentiles of delays), beyond the payment due date as indicative of a population-wide late payment disposition, then the percentage of defaults over the whole population will go down. A "grace period" model is trained with invoices considered delayed only if the payment was delayed beyond the payment due date and an additional number of days of grace period applied. However, the predictability of payments for the remaining invoices will be worse due to an increased coefficient of variation (i.e., Standard Deviation/Mean). Problems include: (1) how to account for such increased variability and lack of predictability in the models?; (2) how are the customers informed about the lack of predictability in the models so that models can be changed for positive business outcomes; should features be changed?; (3) How do useful predictions get generated? Further, problems include how to ensure that in the models a customer does not automatically look "better" when paying lots of small invoices paid and leaving a few large invoices unpaid? In contrast to known solutions, embodiments in general solve the above problems.

Figure 5:
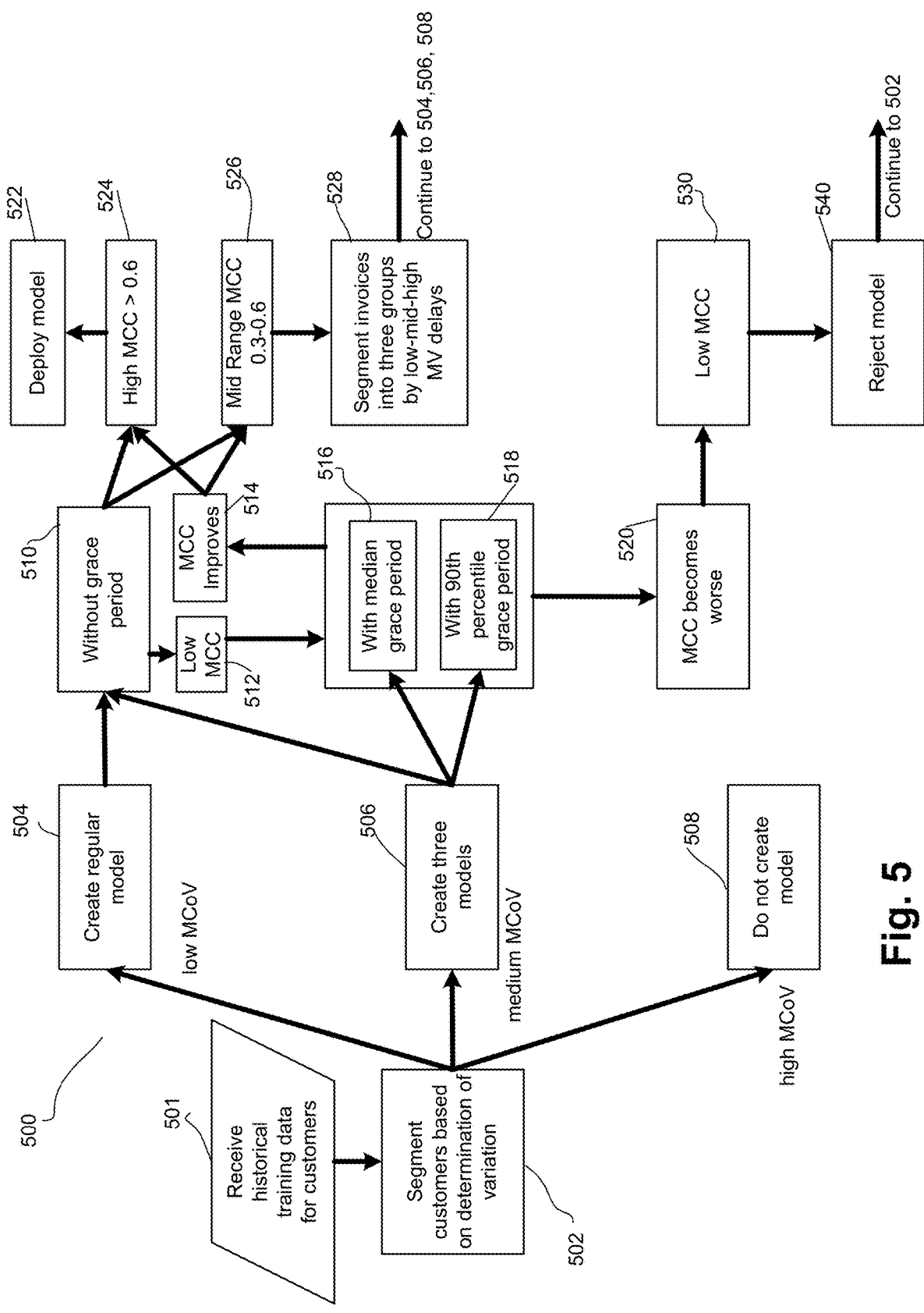
FIG. 5 is a flow diagram of the ML AR prediction model module of FIG. 2 when predicting payment delays of AR payments in accordance to embodiments.

FIG. 5 is a flow diagram of the ML AR prediction model module 16 of FIG. 2 when predicting payment delays of AR payments in accordance to embodiments. In one embodiment, the functionality of the flow diagram of FIG. 5, and FIG. 6 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The functionality 500 of FIG. 5 can be implemented to initially train a ML model, or to re-train a ML model that has poor metrics/performance or otherwise needs improvements.

At 501, the historical training data 402 is received for one or more customers/clients/users (collectively, "customers") in connection with past purchase order transactions from a corporation or any type of organization that has customers (collectively, "corporation") that form the customer payment schedule. In one embodiment, the training data is time dependent and corresponds to each transaction in the form of a database table, with some of the columns corresponding to one of the dates related to the transaction (e.g., purchase order approval date, transaction date, shipment date, etc.). Time dependent data, in general, is data that corresponds to specific dates. Each of the customers having data at 501 can be segmented based on variability in delays in payments or shipment receipts, or other independent variables within a customer's data.

At 502, each of the customers is placed into a specific segment based on a determination of variation for the purpose of segmenting the customers into distributional variability bins to drive partitioned model generation. For cases of extreme class imbalance that is different from what is normally expected, such as 90% of customers defaulting when the normal rate for default is 5-10% for a typical cash flow, embodiments provide a grace period internally (representing de facto due dates) for modeling purposes to bring down the default rate to what is considered normal for sustainable businesses (e.g., <10%) or choose a grace period based on a median or percentile of delay for a customer or for an industry where such data is obtainable. For example, the grace period may vary depending on the industry that the customer belongs to. For example, for the hospitality or manufacturing industry, the typical payment delay may be 60 days. In this instance, the grace period may be 60 days, and while a payment is actually delayed based on days passed since the payment due date, in fact the company is running their business with such delays across many or most of their customers such that it might have become entrenched as part of their status quo business process.

However, the result may be that a customer may be defaulting (i.e., either paying late or not paying at all) even after applying a de facto grace period, but these are also likely to be the most unpredictable customers. Therefore, at 502, for all distributions of class imbalance, in embodiments three (or more) separate groups or segments of customers are created based on their variance of invoice delays using measures such as coefficient of variation, and separate predictive models are generated for each segment or group. Further, in embodiments, a novel "median based coefficient of variation" ("MCoV") is used to determine the variance/variation, in contrast to known measures such as the coefficient of variation ("CoV"), which is determined by the ratio of the standard deviation to the mean. The median based coefficient of variation (MCoV) is much more tolerant to outlier data points compared to the known coefficient of variation (CoV), which might also be used in embodiments where the influence of outliers is negligible.

Specifically, in embodiments, the median based coefficient of variation (also referred to as the "Median Absolute Deviation/Median" or MCoV) of delays is determined for the customer as follows:

$$\text{Median Absolute Deviation/Median} = \frac{\text{median of } |X_i - \text{median}(X)|}{\text{median}(X)}$$

where $X_i$ is the value of the target variable, such as the payment delay of each transaction of the customer. The target variable is the AR delay that the model or models is trained to predict, such as the number of days of delay of payment after receipt of the invoice. In embodiments with a grace period, the number of days of delay is determined to be the number of days the payment is delayed after the grace period is added to the payment due date. Other target variables can be used. Embodiments generally have one target variable of interest at a time that is predicted by the model (e.g., a prediction of a delay in payment past the payment due date), although several target variables may be predicted when using multi-objective, multi-target models, which include multiple models within a large model structure. The prediction of the target variables is based on the relative influence of the independent variables on changes in target variables.

Examples using experimental data for determining the variations at 502 include three example cases of data: (1) Case 1, which has a well-behaved distribution of the delays;

(2) Case 2, which has some outliers of delay; and (3) Case 3, which has a large number of points of high delays or extreme delays.

Using the known CoV formula of the ratio of the standard deviation to the mean, where a distribution with CoV<0.3 is considered low variance, and a distribution>0.7 is considered high variance, leads to the following:

Case 1:

Mean of 59.19, Standard Deviation of 29.90, CoV is 0.51 (i.e., medium variance, or relatively predictable).

Case 2:

Mean of 99.19, Standard Deviation of 428.26, CoV is 4.32 (i.e., very high variance, or not predictable in the extreme).

Case 3:

Mean of 115.74, Standard Deviation of 164.93, CoV is 1.43 (i.e., high variance, or not predictable).

Therefore, using the known CoV formula, a model may be trained from the data from Case 1, but likely not for Case 2 and Case 3, since the data is unpredictable. However, a drawback with using the known CoV formula is that it is affected by extreme values. Other known CoV formulas, such as the "quartile coefficient of dispersion", in which half the interquartile range $(Q_3–Q_1)/2$ is divided by the average of the quartiles (the mid-range), $(Q_1+Q_3)/2$, fail to take the entire dataset into account.

In contrast, using the novel median based coefficient of variation of $$\frac{\text{median of } |X_i - \text{median}(X)|}{\text{median}(X)}$$

in accordance to embodiments results in the following: median(X)

Case 1:

Median of 58.5, Median of Abs (Xi–Median (X)) of 24.5, Median Variation of 0.42 (i.e., medium variance, or relatively predictable).

Case 2:

Median of 59, Median of Abs (Xi–Median (X)) of 25, Median Variation of 0.42 (i.e., medium variance, or relatively predictable).

Case 3:

Median of 58.5, Median of Abs (Xi–Median (X)) of 38; Median Variation of 0.66 (i.e., low variance, or borderline predictable).

Therefore, in contrast to known CoV calculations, using the Median based Coefficient of Variation (MCoV) in accordance to embodiments leads to the calculated variation being unaffected by outliers for all three cases (Cases 1-3). MCoV is advantageous in comparison to the known CoV because, in general, and in embodiments, there is no need to predict the outlier cases as they need to be followed up anyway. Instead, embodiments are trying to predict the cases within the distribution. The outliers affected CoV measure of dispersion will incorrectly label customers, whose payments are otherwise predictable, as unpredictable. In contrast, the MCoV will correctly label them as relatively predictable, as shown above, and therefore, good candidates for the machine learning model driven predictions.

After the median based coefficient of variation (MCoV) is determined for each of the customers at 502, each customer is segmented into three categories based on the MCoV of delays: (1) low MCoV (e.g., under approximately 0.20-0.30); (2) medium MCoV (e.g., between approximately 0.25-0.75); and (3) high MCoV (e.g., over approximately 0.7). These thresholds are configurable in embodiments. In addition, in one embodiment, a further filtering criterion is used, such as the monetary size of transactions, with a focus on the largest transactions, so that customers are not pursued by collections teams for delays in transactions that do not make up a very large portion of the total accounts receivable invoice amount. Therefore, for example, for the purpose of segmentation at 502, embodiments we may consider invoices that are the largest or make up the largest amount of the total AR amount, so that customers are segmented based on the MCoV of delays for the top 25% (by Amount Outstanding) of their outstanding invoices or Invoices with 80% of their amount outstanding. In this specific embodiment, only the largest invoices may be used for segmentation for a given customer out of those provided at 501 to focus on the largest signals, and not all of the invoices, as noted above, although nothing prevents embodiments from using all invoices. The segmentation at 502 is across customers such that there are some customers who will have low variability in payment delays, others with have a medium variability and yet others will have a high variability.

Based on the segmentation, at 504, for the customers with distributions of delays such that there is a low mCoV in delays, a "regular" model 510 is created or generated. Creating or generating an ML model in embodiments includes selecting a model algorithm (e.g., a neural network algorithm, a random forest algorithm, etc.), training the algorithm to create a trained ML model, and then testing and validating the trained ML model. The model at 504 is trained/tested/validated using the training data at 501, and no grace period is used in predicting a delay, resulting in model 510. For customers with distributions of delays such that there is a low mCoV in delays, the customer is considered to have a low variability in delays, which corresponds to their making payments on time or with delays, on a regular basis. The resulting model 510 will generally be a high precision and high recall model because the delays in their invoice payments are in a narrow distribution, and thus more predictable than cases of high variability in the distribution of delays.

Based on the segmentation, at 506, for the customers with distributions of delays such that there is a medium range MCoV, then a plurality of models is generated. In one embodiment, three models are generated, but more models such as 4, 5 or 6 can be used, with different levels of grace period applied, such as $25^{th}$ percentile of delay, median of delay, $75^{th}$ percentile of delay, $90^{th}$ percentile of delay, $95^{th}$ percentile of delay etc. This corresponds to a somewhat predictable customer with intermittent payments, and there is a need for a model to predict and find which customers need to be followed up on, with any resulting model having a relatively acceptable precision and recall.

Of the plurality of models generated at 506, one of the models is the regular model 510. A second model is a model where an invoice payment is considered delayed or defaulted only if it is delayed beyond the payment due date plus the median delay (i.e., grace period) in model 516, such that the number of delayed invoices will be significantly lower than with model 510, although with a higher distributional variability, using the same training algorithm for 510, but generating a new model 516. A third model can be a model with invoices considered delayed only if their payment is delayed beyond the payment due date plus the $90^{th}$ percentile of delays (which is the grace period for this case). Additional models can be created with different levels of grace period applied, such as $25^{th}$ percentile of delay, median of delay, $75^{th}$ percentile of delay, $90^{th}$ percentile of delay, $95^{th}$ percentile of delay, etc. Here, an invoice payment is considered delayed only if it is delayed beyond the payment due date plus the median delay (called grace period) or higher percentiles of delay, and therefore as higher percentiles are chosen as the grace period, the number of delayed invoices is reduced. This is particularly useful when a customer has, for example, 90% of invoices considered delayed, without a de facto grace period being applied as above. Embodiments are able to correct the unnatural class imbalance where most invoices are showing up as delayed, whereas the usual sustainable business scenario tends to be where less than 10% invoice payments are delayed.

Based on the segmentation, at 508, for the customers with distributions of delays such that there is a high MCoV, no model is generated for that customer. The customer is considered a high variability customer with lumpy payments, and no amount of modeling will provide predictable delays. The customers with lumpy payments sometimes make a lot of payments all at once, and then will make no payments for months, and are thus unreliable from a corporate cash flow perspective. Feedback should be provided to the customer to reduce variability for high ticket invoices. The feedback can include a warning that, because of the delays, the company is losing money due to unavailability of working capital, and the delays are highly variable and are adversely affecting cash flow. A request can be made to make the payments within the payment due date, or otherwise cost of working-capital based penalties can be imposed on their payments to recover losses.

After the creation of models 510, 516, 518, embodiments automatically evaluate, select, and deploy the classification models created for each segment of customers. For the evaluation of models, embodiments use the Matthews' Correlation Coefficient ("MCC"), which can measure of the quality of binary (two-class) classifications, such as, for example, whether a customer will pay accounts receivable in time or not. MCC can be calculated as follows:

$$MCC = \frac{TP \times TN - FP \times FN}{\sqrt{(TP+FP)(TP+FN)(TN+FP)(TN+FN)}}$$

where TP is the number of true positives, TN the number of true negatives, FP the number of false positives and FN the number of false negatives. If any of the four sums in the denominator is zero, the denominator can be arbitrarily set to one, which results in a Matthews correlation coefficient of zero, which can be shown to be the correct limiting value. The MCC determination is close to 1 for perfect correct classification, close to −1 for incorrect classification, and close to 0 for random classification. In embodiments, the MCC determinations use the test/validation data 307 split from the training data 304.

For multi-class classification models, such as where there is a need to predict when an invoice is expected to be late_beyond_recovery, very_late, late, within_due_date (as opposed to just whether it will be late or not late), to determine MCC, embodiments can use a measure of informedness or markedness of each model as follows:

$$\text{Informedness} = \text{Recall} + \text{Inverse Recall} - 1 = tpr - fpr = 1 - fnr - fpr,$$

-continued where $tpr$ = true positive rate, $fnr$ = false negative rate, and $fpr$ = false positive rate;

$\text{Sensitive} = \text{true positive rate } (tpr) = TP/(TP+FN);$ $\text{Specificity} = \text{true negative rate } (tnr) = TN/(TN+FP);$ $\text{false positive rate } (fpr) = FP/(TN+FP);$ $\text{false negative rate } (fnr) = FN/(TP+FN);$ $\text{Precision} = \text{positive predictive value} \sim (ppv) = TP/(TP+FP);$ $\text{negative predictive value} \sim (npv) = TN/(TN+FN).$ Among the positive data instances, the ones that the algorithm correctly identified as positive are called true positives (TP), while those wrongly classified as negative are labeled false negatives (FN). On the other side, the negative elements that are correctly labeled negative are called true negatives (TN), while those which are wrongly predicted as positives are called false positives (FP).

$$\text{Bookmaker's Markedness} = tpr + tnr - 1;$$

Then MCC=sqrt(Informedness*Bookmaker's Markedness).

At 512, the MCC is determined for the model without a grace period 510. If the MCC score is low (e.g., MCC<0.25–0.3), the MCC is then determined for both the grace period models 516, 518 (or others if more than 2 were created). If at 514, it is determined that the MCC for grace period models 516, 518 has improved to above a minimum threshold for deployment (e.g., 0.3-0.5) in comparison to the MCC at 514 then the model can be deployed, as this indicates a consistent business practice (i.e., a de facto grace period) at the customer. However, if the MCC does not improve above the threshold this indicates that there is not enough distinguishability between delayed and not delayed invoices, implying that the payments made by this customer are sporadic and thus not predictable by the features. In this case, an alert can be generated to follow up with the customer to discuss the lack of consistency in payments.

If the MCC score for model 510 and/or the improved MCC for grace period models 516, 518 at 514 is high (e.g., MCC>0.6), then at 524 the corresponding trained model 510 without a grace period or one of grace period based models 516, 518 is deployed at 522 and used for predicting AR payment delays for the customer. The grace period model with the highest MCC is chosen for deployment.

If at 520, it is determined that the MCC for grace period models 516, 518 has become worse in comparison to the MCC at 512, then at 530 the MCC is considered too low for deployment, and all the models are rejected at 540 because no model will provide accurate predictions of AR payment delays based on the training data, given the ML algorithms available and chosen for the models. A low Matthews' Correlation Coefficient on the confusion matrix of the classification model shows that the data features do not provide distinguishability between the invoices that were delayed in payments and those there were not delayed, and for this case embodiments need to find additional features that may provide such distinguishability, either manually or automatically using scores such as the GINI score output and p-value for Random Forest and other similar measures. Functionality continues at 502 to find suitable segments of customers, from among this set where MCC was low, to find the ones with lowest MCoV, and create new models for that segment with likely higher MCC. This may lead to smaller sets of customers (still likely a large portion of the overall distribution) for which models can be created, and a relatively larger set of customers (still likely a small portion of the overall distribution) for which models cannot be created as they are very unpredictable in their payment process.

If the MCC score for model 510 and/or the improved MCC for grace period models 516, 518 at 514 is mid range (e.g., MCC=0.3-0.6) at 526, then at 528, each transaction/invoice is placed into one of three segments by clustering the invoices for each customer, similar to as done at 502, using MCoV, into low, medium or high MCoV delays and functionality continues at 504, 506 and 508. Previously, in 502 embodiments segmented each customer as having low/medium/high variability in payment of invoices. Now, at 528, embodiments are going into a second level of granularity in distributional variability by segmenting invoices within each customer's set of invoices into groups with low variability, medium variability and high variability, with groups being clustered by variables such as amount of invoice or purchased item category or geographical location of item purchase.

After the completion of the functionality 500 of FIG. 5, the result is an ML model for each customer (or a composite model for each customer that includes models for each segment of the customer's invoices), where a model can be generated that predicts whether a payment for an invoice will be delayed for a particular invoice. The generated model, in embodiments, can also predict whether a payment will be delayed, how many days will it be delayed, whether it will ever be paid at all, etc.

In addition to generating and creating a model for predicting payment delays of AR invoices, embodiments determine an aggregate reliability of a specific customer at 512 so the vendor can assess the risk of a particular customer by determining a customer reliability score. A high reliability customer means a low average delay and a low cost to company, and vice versa for a low reliability customer.

Figure 6:
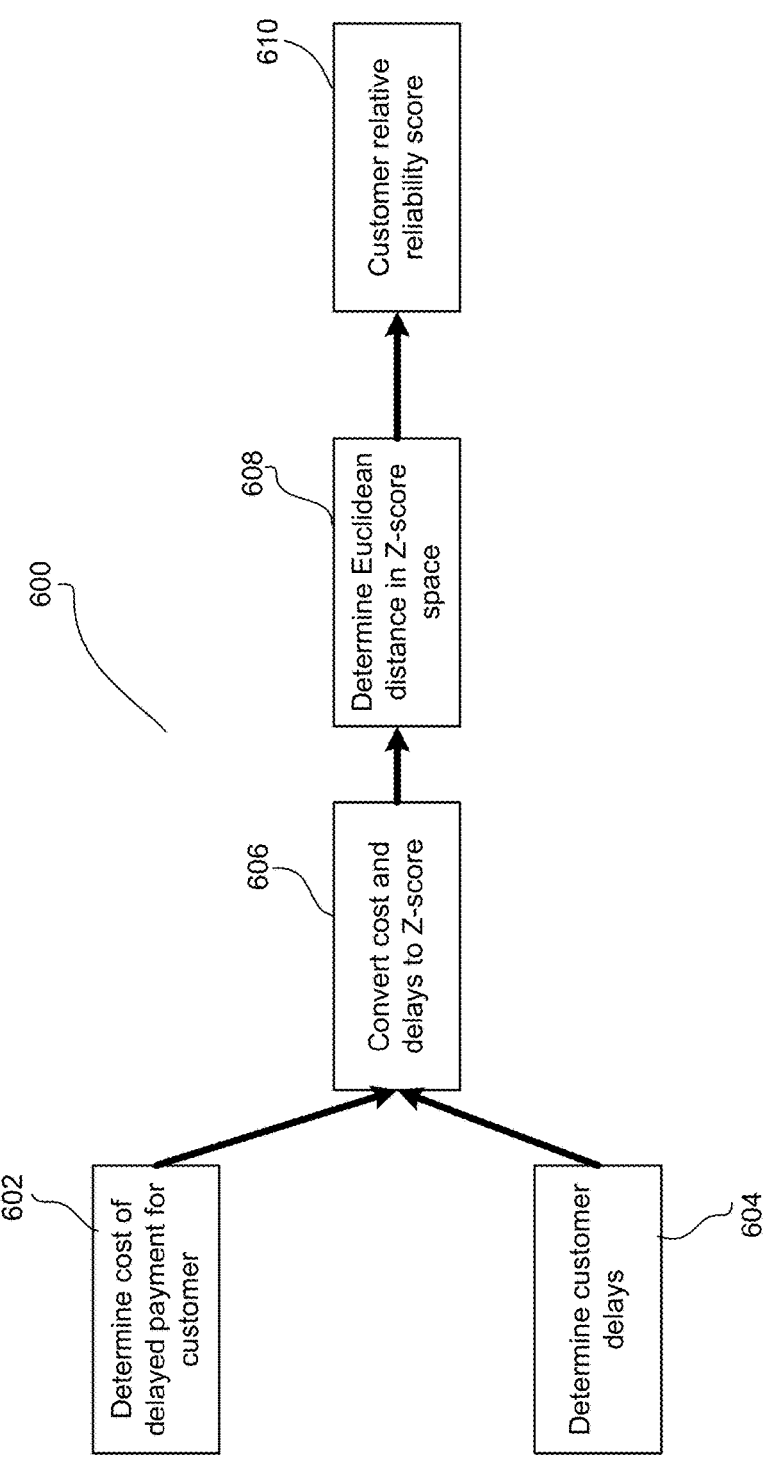
FIG. 6 is a flow diagram of the ML AR prediction model module of FIG. 2 when determining a customer reliability score in accordance to embodiments.

FIG. 6 is a flow diagram of the ML AR prediction model module 16 of FIG. 2 when determining a customer reliability score in accordance to embodiments. The functionality of FIG. 6 is based what the customer payment delays costs the company and how much worse each customer is relative to their peers regarding delayed payments. The result of the functionality of FIG. 6 can be provided as part of the feedback given to customers identified as having unreliable or unpredictable payments in FIG. 5.

At 602, the cost of a delayed payment from the customer is determined as follows as a dynamic penalty:

Dynamic Cost of Late Paying Customer to Company =

$$WACC * \frac{\sum_{i=1}^{i=n} d_i * A_i - discount_i + penalty_i}{365}$$

where:

$d_i$=# of Days Delay in Payment Beyond Due Date for ith Invoice;

Leave out negative values as they count in favor, but they are accounted for in terms of discount given;

If someone paid late, if there was a penalty imposed, that should be subtracted from this cost;

$A_i$=Amount Outstanding for ith Invoice (minus any discount for that invoice and plus any penalty for that invoice);

WACC=Weighted Average Cost of Capital as annual compound interest percentage (obtainable using public information on an industry-by-industry basis and by geography).

Added to the above cost is an optional static penalty depending on the size/revenue/profit of the company. In embodiments, if the cost of the late paying customer to the company exceeds 0.1% of the company's total Accounts Receivable or $1 M (or a different fixed amount), whichever is lower, then Payment Terms will change, such as delay costs being applied to their payments, with the Cost of Capital (WACC) based Dynamic Cost of Late Paying Customer to Company being added directly to the customer's total amount outstanding, and an alert is generated for the customer to immediately pay the increased amount outstanding. This embodies the notion of sequence, balancing the loss created for the company with the loss created by the customer. For example, for historical purchases, considering payment, what would the penalty have been such that the company ends with a zero net balance? The regular static late penalties may lead to over-estimating the penalty or end up being unnecessarily punitive. Typically, static penalties such as 1%-5% of the total outstanding are specified for delayed payment, in contracts, without regard to how much the actual cost to company was due to the delays, as the costs increase with delay. In contrast, with embodiments, the dynamic late penalties keep increasing with delays as compounded interest, and based on the cost of capital changes in the market. This gives an incentive to the customer to pay early.

At 604, the average delay for a given customer is determined as follow:

$$Average\ delay = \frac{\sum_{i=1}^{i=n} d_i * A_i}{\sum_{i=1}^{i=n} A_i}$$

where "n" is the total number of invoices for a customer. This gives an amount of weighted delay for the customer, including an overall average delay for the customer. For example, if the customer has paid a large amount of $100 invoices early, even a short delay on a $1 M invoice will dominate the average delay.

At 606, the cost from 602 and the delay from 604 is converted into a Z-Score (i.e., a statistical measurement of a score's relationship to the mean in a group of scores). For the specific customer's average delay at 604, the Z-Score, Zd=(Specific Customer's Avg. Delay−Avg of Customer Avg Delay)/Std Dev of Customer Avg. Delay. This determines how far this customer's average delay is from their peers.

The Z-Score of Cost of a Specific Customer to the Company (from 602)=Zc=(Specific Customer Cost to Company−Avg of Customer Cost to Company)/Std Dev of Cost of Customer to Company. This determines how much more expensive is this customer compared to their peers.

At 608, the Euclidean distance in the Z-score space is determined to generate the Customer Relative Reliability Score ("CRRS") at 610 as follows:

$$CRRS = \sqrt{Zd^2 + Zc^2}$$

If the score is close to 1, this is a good customer. If the score is beyond 2-3, then this is a risky customer. If the score is greater than 4, then this is a bad customer that should be dropped.

Data Analytics Environment

In one embodiment, embodiments of the invention are implemented as part of a cloud based data analytics environment. In general, data analytics enables the computer-based examination or analysis of large amounts of data, in order to derive conclusions or other information from that data; while business intelligence tools provide an organization's business users with information describing their enterprise data in a format that enables those business users to make strategic business decisions.

Examples of data analytics environments and business intelligence tools/servers include Oracle Business Intelligence Server ("OBIS"), Oracle Analytics Cloud ("OAC"), and Fusion Analytics Warehouse ("FAW"), which support features such as data mining or analytics, and analytic applications.

Figure 7:
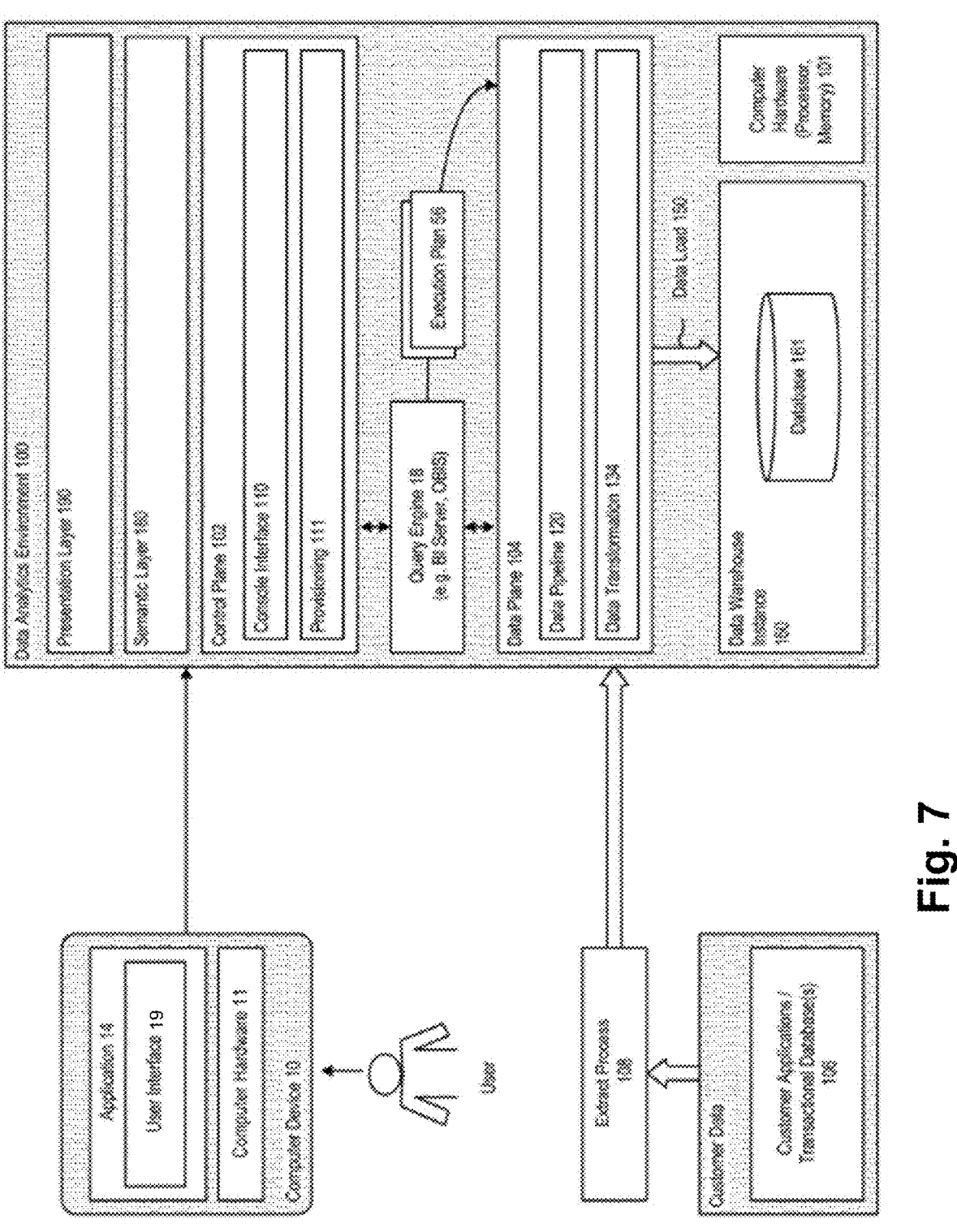
FIGS. 7-11 illustrate an example data analytics environment in accordance with an embodiment.

FIG. 7 illustrates an example data analytics environment, in accordance with an embodiment. The example embodiment illustrated in FIG. 7 is provided for purposes of illustrating an example of a data analytics environment in association with which various embodiments described herein can be used. In accordance with other embodiments and examples, the approach described herein can be used with other types of data analytics, database, or data warehouse environments. The components and processes illustrated in FIG. 7, and as further described herein with regard to various other embodiments, can be provided as software or program code executable by, for example, a cloud computing system, or other suitably-programmed computer system.

As illustrated in FIG. 7, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160, database 161, or other type of data source.

In accordance with an embodiment, the control plane operates to provide control for cloud or other software products offered within the context of a SaaS or cloud environment, such as, for example, an Oracle Analytics Cloud environment, or other type of cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface ("GUI") and/or a command-line interface ("CLI") or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an extract, transform, and load ("ETL") process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model ("KM"), or other type of data model, that the system uses to transform the transactional data received from business applications and corresponding transactional databases provisioned in the SaaS environment, into a model format understood by the data analytics environment. The model format can be provided in any data format suited for storage in a data warehouse. In accordance with an embodiment, the data plane can also include a data and configuration user interface, and mapping and configuration database.

In accordance with an embodiment, the data plane is responsible for performing ETL operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the data analytics schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction of the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

In accordance with an embodiment, the data pipeline or process can operate in combination with the data transformation layer to transform data into the model format. The mapping and configuration database can store metadata and data mappings that define the data model used by data transformation. The data and configuration user interface ("UI") can facilitate access and changes to the mapping and configuration database.

In accordance with an embodiment, the data transformation layer can transform extracted data into a format suitable for loading into a customer schema of data warehouse, for example according to the data model. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150 to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a semantic model can be defined, for example, in an Oracle environment, as a BI Repository ("RPD") file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

In accordance with an embodiment, the presentation layer can enable access to the data content using, for example, a software analytic application, user interface, dashboard, key performance indicators ("KPI"'s); or other type of report or interface as may be provided by products such as, for example, Oracle Analytics Cloud, or Oracle Analytics for Applications.

In accordance with an embodiment, a query engine 18 (e.g., OBIS) operates in the manner of a federated query engine to serve analytical queries within, e.g., an Oracle Analytics Cloud environment, via SQL, pushes down operations to supported databases, and translates business user queries into appropriate database-specific query languages (e.g., Oracle SQL, SQL Server SQL, DB2 SQL, or Essbase MDX). The query engine (e.g., OBIS) also supports internal execution of SQL operators that cannot be pushed down to the databases.

In accordance with an embodiment, a user/developer can interact with a client computer device 10 that includes a computer hardware 11 (e.g., processor, storage, memory), user interface 19, and application 14. A query engine or business intelligence server such as OBIS generally operates to process inbound, e.g., SQL, requests against a database model, build and execute one or more physical database queries, process the data appropriately, and then return the data in response to the request.

To accomplish this, in accordance with an embodiment, the query engine or business intelligence server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a query engine or business intelligence server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine (e.g., OBIS) can process queries against a database according to a query execution plan 56, that can include various child (leaf) nodes, generally referred to herein in various embodiments as RqLists, and produces one or more diagnostic log entries. Within a query execution plan, each execution plan component (RqList) represents a block of query in the query execution plan, and generally translates to a SELECT statement. An RqList may have nested child RqLists, similar to how a SELECT statement can select from nested SELECT statements.

In accordance with an embodiment, during operation the query engine or business intelligence server can create a query execution plan which can then be further optimized, for example to perform aggregations of data necessary to respond to a request. Data can be combined together and further calculations applied, before the results are returned to the calling application, for example via the ODBC interface.

In accordance with an embodiment, a complex, multi-pass request that requires multiple data sources may require the query engine or business intelligence server to break the query down, determine which sources, multi-pass calculations, and aggregates can be used, and generate the logical query execution plan spanning multiple databases and physical SQL statements, wherein the results can then be passed back, and further joined or aggregated by the query engine or business intelligence server.

Figure 8:
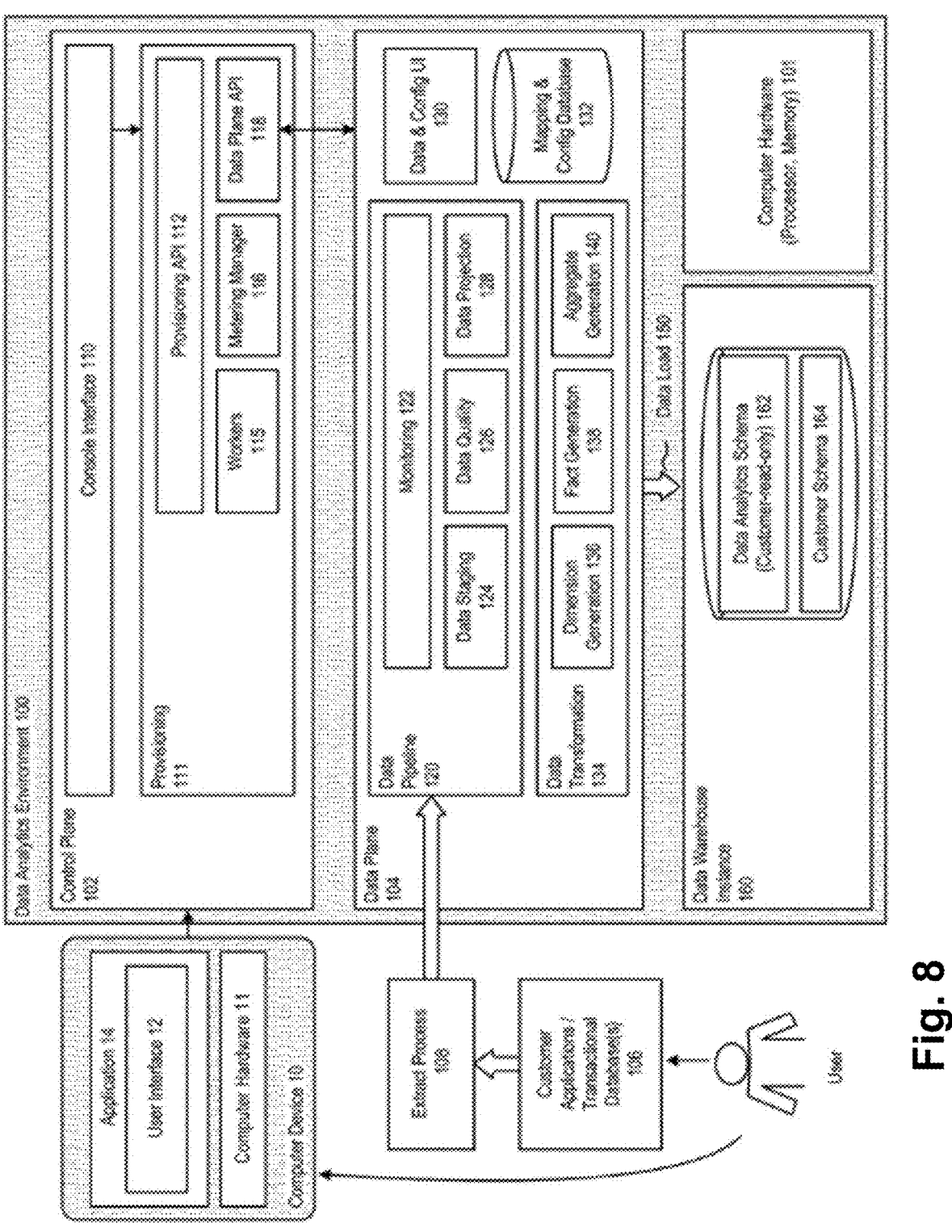

FIG. 8 further illustrates an example data analytics environment, in accordance with an embodiment. As illustrated in FIG. 8, in accordance with an embodiment, the provisioning component can also comprise a provisioning application programming interface ("API") 112, a number of workers 115, a metering manager 116, and a data plane API

118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default data analytics schema (referred to herein in accordance with some embodiments as an analytic warehouse schema) 162 and, for each customer (tenant) of the system, a customer schema 164.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure, to load the transformed data into the customer schema of the data warehouse instance. Subsequent to the loading of the transformed data into customer schema, the transformed data can be analyzed and used in a variety of additional business intelligence processes.

Figure 9:
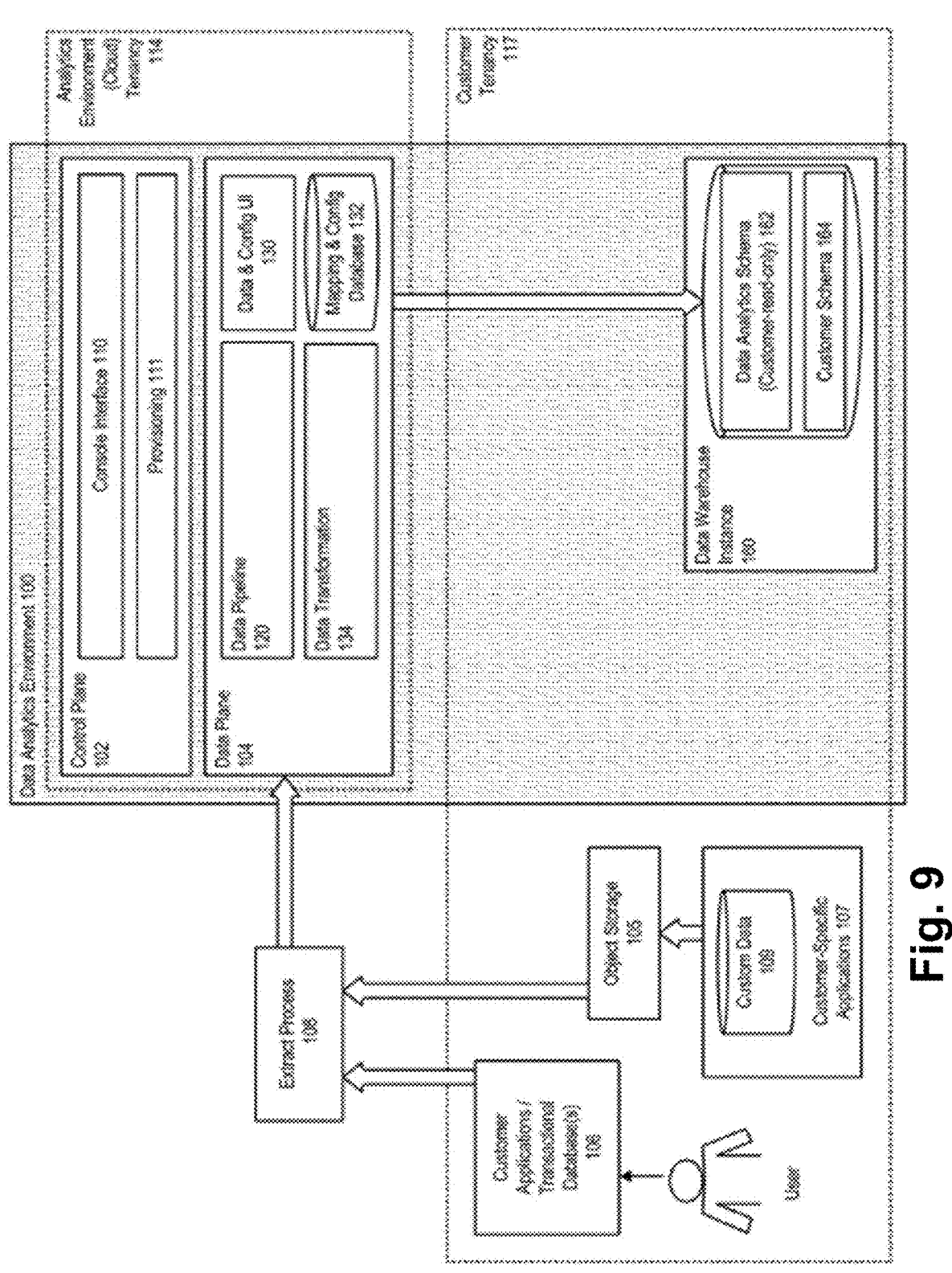

FIG. 9 further illustrates an example data analytics environment, in accordance with an embodiment. As illustrated in FIG. 9, in accordance with an embodiment, data can be sourced, e.g., from a customer's (tenant's) enterprise software application or data environment (106), using the data pipeline process; or as custom data 109 sourced from one or more customer-specific applications 107; and loaded to a data warehouse instance, including in some examples the use of an object storage 105 for storage of the data.

In accordance with embodiments of analytics environments such as, for example, Oracle Analytics Cloud ("OAC"), a user can create a data set that uses tables from different connections and schemas. The system uses the relationships defined between these tables to create relationships or joins in the data set.

In accordance with an embodiment, for each customer (tenant), the system uses the data analytics schema that is maintained and updated by the system, within a system/cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that is readily modifiable by the customer, and which allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse (e.g., ADW) can include a data analytics schema and, for each customer/tenant, a customer schema sourced from their enterprise software application or data environment. The data provisioned in a data warehouse tenancy (e.g., an ADW cloud tenancy) is accessible only to that tenant; while at the same time allowing access to various, e.g., ETL-related or other features of the shared environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 10:
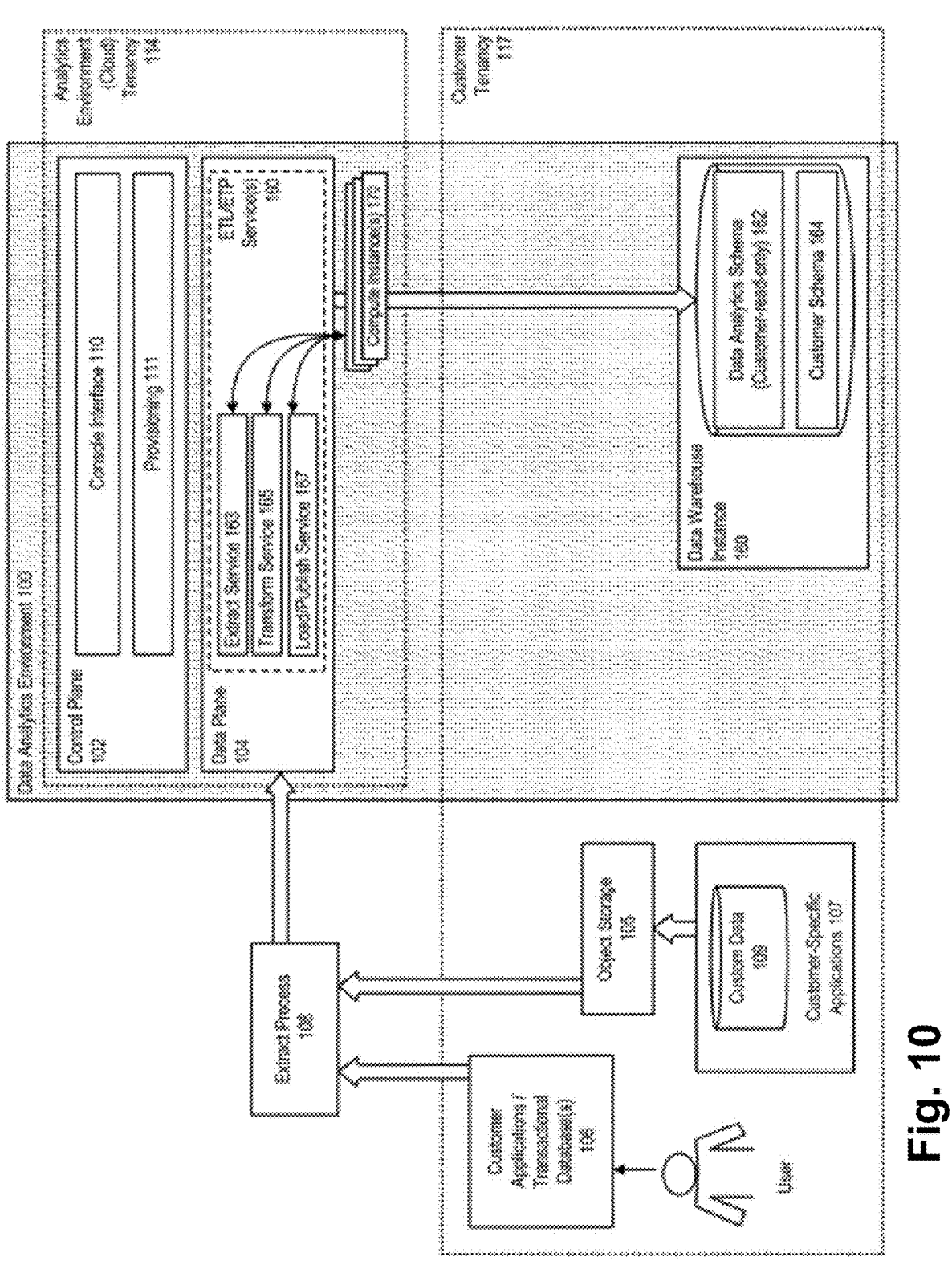

FIG. 10 further illustrates an example data analytics environment, in accordance with an embodiment. As illustrated in FIG. 10, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

For example, in accordance with an embodiment, a list of view objects for extractions can be submitted, for example, to an Oracle BI Cloud Connector ("BICC") component via a ReST call. The extracted files can be uploaded to an object storage component, such as, for example, an Oracle Storage Service ("OSS") component, for storage of the data. The transformation process takes the data files from object storage component (e.g., OSS), and applies a business logic while loading them to a target data warehouse, e.g., an ADW database, which is internal to the data pipeline or process, and is not exposed to the customer (tenant). A load/publish service or process takes the data from the, e.g., ADW database or warehouse, and publishes it to a data warehouse instance that is accessible to the customer (tenant).

Figure 11:
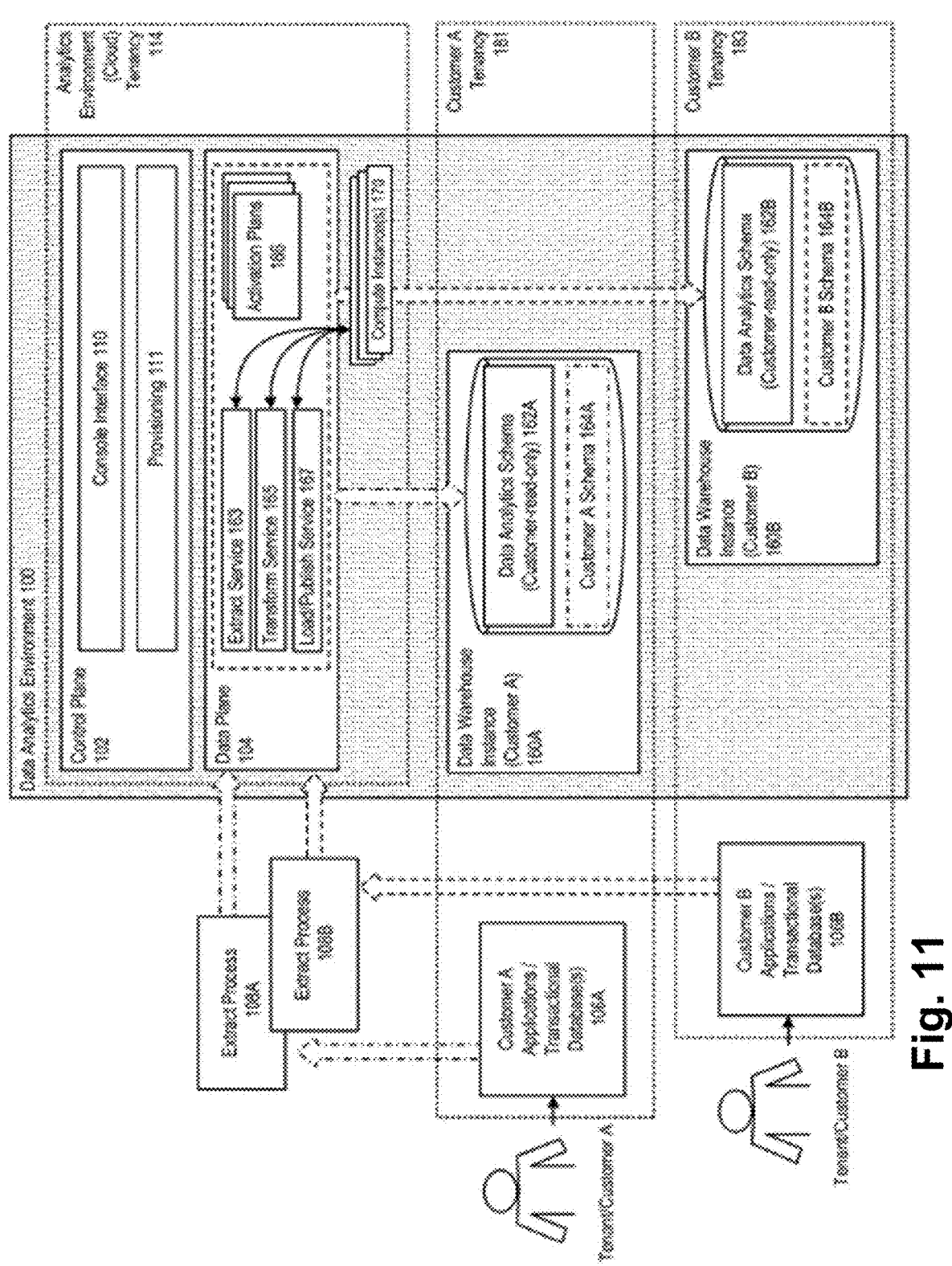

FIG. 11 further illustrates an example data analytics environment, in accordance with an embodiment. As illustrated in FIG. 11, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case.

In accordance with an embodiment, for each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

As disclosed, traditionally AR prediction models on paid versus unpaid invoices and aging buckets do not take into account the business reality of payments delayed and different classes of customers. When payments get delayed, a model cannot simply provide a grace period to every customer uniformly. Some customers cannot be given a grace period because they are habitual late payers, etc.

In contrast, embodiments accommodate different classes of customers differently. Embodiments capture high variability across invoices within a customer and go deeper into customer characteristics. Embodiments apply variability differently to different customers and create metrics that identify where the customers lies by creating new metrics of delay. Embodiments then create the model. Embodiments further determined the reliability of a specific customer.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of optimizing a predicting of a target variable using a system comprising a plurality of different machine learning (ML) models in a cloud based analytics system for a tenant of the cloud based analytics system, the method comprising:

receiving historical data corresponding to a plurality of transactions corresponding to a plurality of customers of the tenant, the historical data comprising, for each of the transactions, the target variable;

for a first customer, receiving a plurality of trained ML models corresponding to the target variable, the plurality of trained ML models trained using the historical data and comprising a first trained model having no grace period for the target variable and two or more different grace period trained models, each grace period trained model having different grace periods for the target variable;

determining a Matthews' Correlation Coefficient (MCC) for the first trained model;

when the MCC for the first trained model is low, determining the MCC for each of the grace period trained models, and when one or more MCCs for each of the grace period trained models is higher than the MCC for the first trained model and exceed a threshold MCC, selecting a corresponding grace period trained model having a highest MCC; and when the first trained model or the selected grace period trained model has a high MCC, deploying the first trained model or the selected grace period trained model to predict the target variable;

wherein receiving the historical data comprises retrieving the historical data as a dataset from a transactional database corresponding to the tenant in response to an activation plan, the activation plan:

extracting the historical data to a data staging area corresponding to the tenant;

transforming the historical data into a data warehouse format by a data transformation layer; and loading the transformed historical data into a data warehouse for the cloud based analytics system corresponding to the tenant.

2. The method of claim 1, further comprising:

when the MCC for each of the grace period trained models is lower than the MCC for the first trained model, not deploying the first trained model or the selected grace period trained model to predict the target variable.

3. The method of claim 1, further comprising:

when the first trained model or the selected grace period trained model has a mid range MCC, segmenting each of the transactions for the first customer, the segmenting comprising determining a measure of variability of the target variable for each transaction and, based on the measure of variability, classifying each transaction as having a low variation, a medium variation, or a high variation.

4. The method of claim 3, wherein the low MCC is approximately less than 0.3, the mid range MCC is approximately 0.3-0.6, and the high MCC is approximately greater than 0.6.

5. The method of claim 4, wherein:

$$MCC = \frac{TP \times TN - FP \times FN}{\sqrt{(TP + FP)(TP + FN)(TN + FP)(TN + FN)}}$$

where TP is a number of true positives, TN is a number of true negatives, FP is a number of false positives and FN is a number of false negatives.

6. The method of claim 3, wherein determining the measure of variability for the first customer comprises using a median based coefficient of variation.

7. The method of claim 6, wherein the median based coefficient of variation comprises:

$$\frac{\text{median of } |X_i - \text{median}(X)|}{\text{median}(X)}$$

where $X_i$ is a value of the target variable for each transaction i of the first customer and median (X) is the median of the target variables from all transactions of the first customer.

8. The method claim 1, wherein the target variable is a number of days that a payment is delayed after a payment due date for each transaction and the transforming the historical data into the data warehouse format comprises at least one of dimension generation, fact generation or aggregate generation.

9. The method of claim 1, further comprising:

segmenting each of the customers based on the historical data corresponding to each of the customers, the segmenting comprising determining a measure of variability of the target variable for each customer and, based on the measure of variability, classifying each customer as having a low variation, a medium variation, or a high variation;

for each low variation customer, creating the first trained model; and for each medium variation customer, creating the first trained model and creating the two or more grace period trained models.

10. A non-transitory computer readable medium having instructions stored thereon that, when executed by one or more processors, cause the processors to optimize a prediction of a target variable using a system comprising a plurality of different machine learning (ML) models in a cloud based analytics system for a tenant of the cloud based analytics system, the predicting comprising:

receiving historical data corresponding to a plurality of transactions corresponding to a plurality of customers of the tenant, the historical data comprising, for each of the transactions, the target variable;

for a first customer, receiving a plurality of trained ML models corresponding to the target variable, the plurality of trained ML models trained using the historical data and comprising a first trained model having no grace period for the target variable and two or more grace period trained models, each grace period trained model having different grace periods for the target variable;

determining a Matthews' Correlation Coefficient (MCC) for the first trained model;

when the MCC for the first trained model is low, determining the MCC for each of the grace period trained models, and when one or more MCCs for each of the grace period trained models is higher than the MCC for the first trained model, selecting a corresponding grace period trained model having a highest MCC; and when the first trained model or the selected grace period trained model has a high MCC, deploying the first trained model or the selected grace period trained model to predict the target variable;

wherein receiving the historical data comprises retrieving the historical data as a dataset from a transactional database corresponding to the tenant in response to an activation plan, the activation plan:

extracting the historical data to a data staging area corresponding to the tenant;

transforming the historical data into a data warehouse format by a data transformation layer; and loading the transformed historical data into a data warehouse for the cloud based analytics system corresponding to the tenant.

11. The computer readable medium of claim 10, the predicting further comprising:

when the MCC for each of the grace period trained models is lower than the MCC for the first trained model, not deploying the first trained model or the selected grace period trained model to predict the target variable.

12. The computer readable medium of claim 10, the predicting further comprising:

when the first trained model or the selected grace period trained model has a mid range MCC, segmenting each of the transactions for the first customer, the segmenting comprising determining a measure of variability of the target variable for each transaction and, based on the measure of variability, classifying each transaction as having a low variation, a medium variation, or a high variation.

13. The computer readable medium of claim 12, wherein the low MCC is approximately less than 0.3, the mid range MCC is approximately 0.3-0.6, and the high MCC is approximately greater than 0.6.

14. The computer readable medium of claim 13, wherein:

$$MCC = \frac{TP \times TN - FP \times FN}{\sqrt{(TP + FP)(TP + FN)(TN + FP)(TN + FN)}}$$

where TP is a number of true positives, TN is a number of true negatives, FP is a number of false positives and FN is a number of false negatives.

15. The computer readable medium of claim 12, wherein determining the measure of variability for the first customer comprises using a median based coefficient of variation.

16. The computer readable medium of claim 15, wherein the median based coefficient of variation comprises:

$$\frac{\text{median of } |X_i - \text{median}(X)|}{\text{median}(X)}$$

where $X_i$ is a value of the target variable for each transaction i of the first customer and median (X) is the median of the target variables from all transactions of the first customer.

17. The computer readable medium claim 10, wherein the target variable is a number of days that a payment is delayed after a payment due date for each transaction and the transforming the historical data into the data warehouse format comprises at least one of dimension generation, fact generation or aggregate generation.

18. The computer readable medium of claim 10, the predicting further comprising:

segmenting each of the customers based on the historical data corresponding to each of the customers, the segmenting comprising determining a measure of variability of the target variable for each customer and, based on the measure of variability, classifying each customer as having a low variation, a medium variation, or a high variation;

for each low variation customer, creating the first trained model; and for each medium variation customer, creating the first trained model and creating the two or more grace period trained models.

19. A cloud based machine learning (ML) model analytics system for optimizing a predicting of a target variable for a tenant of the cloud based analytics system, the system comprising:

a plurality of trained ML models comprising a first trained model having no grace period for the target variable and two or more grace period trained models, each grace period trained model having different grace periods for the target variable;

one or more processors executing instructions and configured to:

receive historical data corresponding to a plurality of transactions corresponding to a plurality of customers of the tenant, the historical data comprising, for each of the transactions, the target variable;

for a first customer, using the a plurality of trained ML models corresponding to the target variable, the plurality of trained ML models trained using the historical data;

determine a Matthews' Correlation Coefficient (MCC) for the first trained model;

when the MCC for the first trained model is low, determine the MCC for each of the grace period trained models, and when one or more MCCs for each of the grace period trained models is higher than the MCC for the first trained model, select a corresponding grace period trained model having a highest MCC; and when the first trained model or the selected grace period trained model has a high MCC, deploy the first trained model or the selected grace period trained model to predict the target variable;

wherein receiving the historical data comprises retrieving the historical data as a dataset from a transactional database corresponding to the tenant in response to an activation plan, the activation plan configured to:

extracts the historical data to a data staging area corresponding to the tenant;

transforms the historical data into a data warehouse format by a data transformation layer; and loads the transformed historical data into a data warehouse for the cloud based analytics system corresponding to the tenant.

20. The system of claim 19, further comprising:

when the MCC for each of the grace period trained models is lower than the MCC for the first trained model, not deploying the first trained model or the selected grace period trained model to predict the target variable.

\* \* \* \* \*